Figure 1:
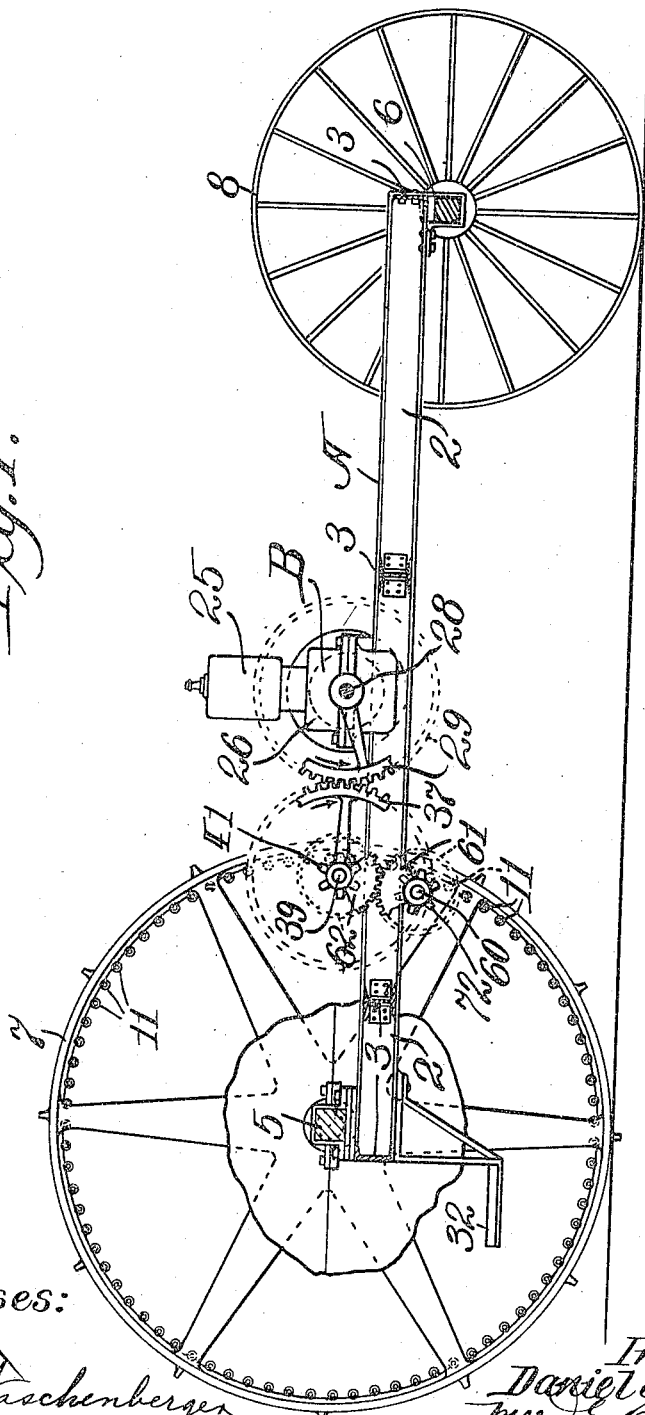

D. MEYER.
TRACTOR.
APPLICATION FILED APR. 14, 1913.

1,137,652.

Patented Apr. 27, 1915.
3 SHEETS—SHEET 1.

Witnesses:
Inventor:
Daniel Meyer,
by Attorney

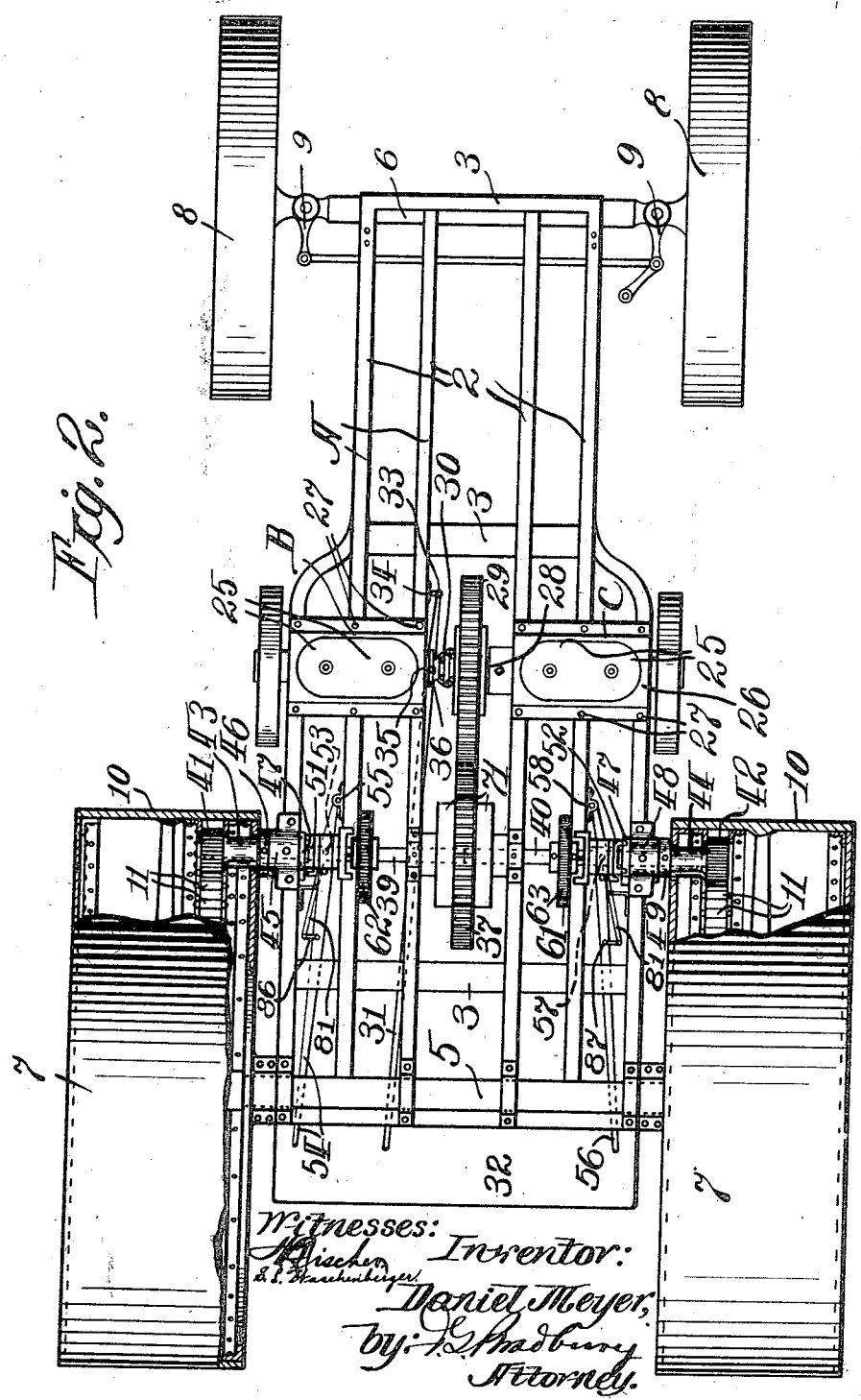

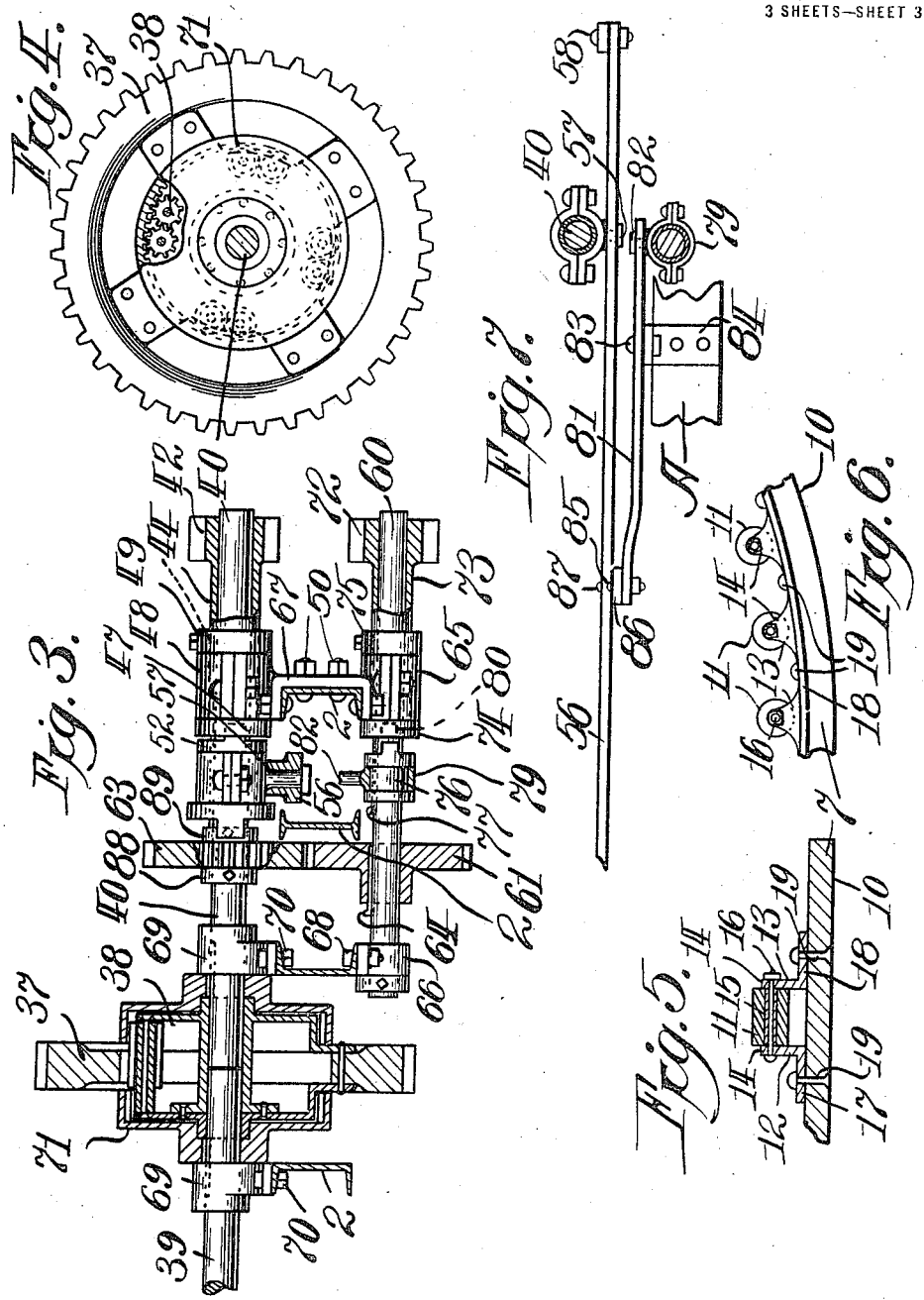

UNITED STATES PATENT OFFICE.

DANIEL MEYER, OF MORRIS, MINNESOTA.

TRACTOR.

1,137,652.  Specification of Letters Patent.  Patented Apr. 27, 1915.

Application filed April 14, 1913. Serial No. 760,892.

*To all whom it may concern:*

Be it known that I, DANIEL MEYER, a citizen of the United States, residing at Morris, in the county of Stevens and State of Minnesota, have invented a new and useful Improvement in Tractors, of which the following is a specification.

An object of this invention is the production of a simple, inexpensive and effective tractor, that is particularly adapted for use by persons unfamiliar with machinery and which will withstand rough use.

Another object is to produce a machine of the character designated in which the prime mover is so connected with the driving element or elements that the transmission is as direct and efficient as possible, producing a powerful self propelled vehicle which is light in weight and adapted for general farm work.

Other objects will be apparent from the following description.

It has heretofore been customary to employ complicated and expensive mechanism in farm tractors necessitating great weight and a large amount of fuel to obtain traction and speed which are required in producing a practical machine. With my invention the weight and fuel consumed are reduced to a minimum and the mechanism simplified without impairing traction in producing a thoroughly practical and economical structure, which can be used in soft fields for plowing, seeding, harvesting and other work or on the road for hauling heavy loads of grain or other commodities.

In the accompanying drawings forming part of this specification, Figure 1 is a side elevation partly in section illustrating my improved tractor; Fig. 2 is a plan view partly in section; Fig. 3 is a detail partly in section illustrating part of the transmission mechanism; Fig. 4 is a side elevation partly in section of part of the transmission mechanism illustrating the differential mechanism which may be used; Fig. 5 is a detail of one of the drive wheels; Fig. 6 is another detail looking at the side of the structure illustrated in Fig. 5, and Fig. 7, is a plan showing a detail of the shifting levers for throwing the clutches into and out of operation in the transmission mechanism.

In the drawings A indicates a suitable frame or body of angle iron construction and composed of longitudinal beams 2 and transverse beams 3 connected thereto and forming a rigid structure carrying the rear axle 5 and the forward axle 6. Upon the rear axle are suitably journaled a pair of drive wheels 7, which are of similar construction and upon the front axle are carried suitable carrying wheels 8, which as illustrated are of less diameter than the drive wheels. Suitable steering parts 9 are interposed in the front axle for the purpose of guiding the carrying wheels, this part of the structure being of ordinary form and not constituting an essential part of my invention, it being understood that any steering mechanism may be employed for guiding the front wheels. The drive wheels 7 are each provided with broad traction faces or rims 10, which are adapted to run upon the ground to propel the vehicle. The inner surface of the rim of each of these wheels is provided with cog teeth in the form of antifriction rollers 11 suitably spaced apart circumferentially of the drive wheel and carried by a pair of rings 12 and 13 of angle iron, which are mounted upon the inner face of the rim. The rings 12 and 13 are spaced apart laterally with two of their sides 14 resting at right angles to the inner face of the rim and to which a hollow shaft 15 is secured endwise by a bolt 16 passing through said sides and clamping said shaft in place. On each of the shafts 15 an antifriction roller 11 is freely journaled. The laterally extending sides 17 and 18 of the rings are secured to the inner face of the rim by rivets 19 or other suitable means. Power is applied to the drive wheel 7 by suitable pinions, the teeth of which mesh with the teeth formed by the antifriction rollers 11 on the inner surface of the rim 10 of the drive wheels as will be hereinafter described. This mode of propelling the drive wheels is very efficient and effective because power is directly applied close to the traction.

Mounted upon the frame A are two gas engines B and C constituting a prime mover from which power is transmitted to the drive wheels. Each of these engines as illustrated is provided with a pair of cylinders 25 carried by a shell 26, which is secured to the frame A of the vehicle by bolts 27, the drive shaft 28 (see Fig. 1), being common to both structures. It is obvious that a pair of drive shafts may be employed, one for each engine and arranged in co-axial alinement, said shafts being suitably connected to produce in effect a single shaft. The axis of the shaft or shafts of the engines is parallel with the axis on which the drive wheels 7 are arranged. Mounted upon the shaft or shafts of the engines B and C is a main drive gear 29, said gear being free to rotate on the shaft or shafts and adapted to be connected therewith by a suitable clutch 30, which is thrown into and out of operation to connect or disconnect the gear 29 by means of a lever handle 31 extending back within reach of the operator standing upon the platform 32 at the rear end of the machine. The handle 31 is pivoted by one end at 33 upon a bracket 34, which is mounted upon the frame A of the machine and the intermediate portion of the handle is pivotally connected at 35 to a collar 36, which is connected to the driving element of the clutch 30 in the usual manner. Meshing with the teeth of the main drive gear 29 is a transmission gear 37, which is carried by differential gearing 38, said gearing being carried by the adjacent ends of a pair of shafts 39 and 40. The shafts 39 and 40 and the driven gear 37 are arranged on an axis parallel with the axis of the shaft or shafts of the engines and their outer ends carry pinions 41 and 42, whose teeth mesh with the teeth of the gear formed by the anti-friction rollers 11 on the inner surface of the rims of the drive wheels 7 and are adapted to drive the wheels in one direction.

The pinion 41 is integral with a sleeve 43 and the pinion 42 integral with the sleeve 44, said sleeves being respectively mounted upon the shafts 39 and 40. The sleeve 43 is journaled in the bearing 45 and held from longitudinal movement by the collar 46 and an annular shoulder such as indicated by 47 in Fig. 3 of the drawings. The sleeves 43 and 44 are similar in construction, the sleeve 44 being held longitudinally in place in its bearing 48 by the collar 49 and an annular shoulder 47. The bearings 45 and 48 are mounted upon the frame A and secured thereto such as by bolts 50. As a result the sleeves and pinions 41 and 42 always revolve with the drive wheels. The sleeves 43 and 44 are free to turn on the shafts 39 and 40, but are adapted to be connected thereto and driven by means of clutches 51 and 52, said clutches being feathered to the shafts 39 and 40 and slidably mounted upon said shafts whereby they may be moved into and out of connection with the sleeves 43 and 44 and the pinions which they carry. The driving member of each of the clutches 51 and 52 is pivotally connected to a handle by which it is operated, the driving member of clutch 51 being pivoted at 53 to the handle 54, said handle having its end pivotally connected to the frame A of the structure at 55. The driving member of clutch 52 is similarly connected to the operating handle 56 by the pivot 57, the inner end of said handle being pivotally attached at 58 to the frame A. By this construction the driving members of the clutches can be shifted into and out of connection with the driven elements connecting with the pinions 41 and 42.

The differential gearing 38 is of ordinary construction, it being preferable not to use bevel gears interposed between its driving member 37 and the driven shafts 39 and 40, thereby transmitting power to said shafts with little friction and loss.

In operation, the engines B and C revolve the gear 39 which transmits its motion through the gear 37 differential gearing 38, shafts 39 and 40, sleeves 43 and 44 and pinions 41 and 42 to the rim of the drive wheels, no bevel gears being employed and the application of power being very direct and with little loss. To reverse the motion of the drive wheels a counter shaft 60, (see Fig. 3), is employed below each of the shafts 39 and 40, motion being transmitted to each of said counter shafts, through a driven gear 61 on each by a driving gear 62 freely mounted on the shaft 39 and a driving gear 63 freely mounted upon the shaft 40. The gear 61, (see Fig. 3) is secured to the counter shaft 60 by the key 64 and said shaft 60 is freely journaled in the bearings 65 and 66. The bearing box 48 is formed integral with a web 67 extending downwardly over the side of the longitudinal bar 2, to which it is secured by the bolts 50, and formed integral on the lower end of said web is the bearing box 65. The bearing box 66 is secured to one of the longitudinal bars 2 of the frame A by bolts 68 passing through its lower flange and to the upper flange of the same longitudinal bar 2, another bearing box 69 is fastened by bolts 70 in which bearing box the shaft 40 is also journaled. This mode of construction is followed on each side of the differential gearing below the shafts 39 and 40 and it will be noted that the bearing boxes 69 between which the differential gearing is placed prevents lateral movement of the casing 71 of the differential gearing. The counter shafts 60 in co-axial alinement lie parallel with the axis of the shafts 39 and 40 and below them. Upon the outer end of the shaft 60 is a pinion 72 similar to the pinion 42, the pinions on the two counter shafts being adapted to mesh with the teeth on the inner surfaces of the rims of the drive wheels and revolve with the drive wheels. The pinion 72 is formed with a sleeve 73 similar to the sleeve 44 and is journaled in the bearing 65. The inner end of said sleeve is formed with an annular stop shoulder 74 and a collar 75 is mounted on the sleeve, said shoulder 74 and collar 75 being placed on opposite sides of the bearing 65, and serving to limit longitudinal movement of the sleeve in its bearing and of the pinion which it carries. Mounted upon the shaft 60 is a clutch 76 which is secured thereto by means of the feather 77. This clutch is formed with a driving member 78 and a shifting collar 79, said driving member being adapted to move into and out of engagement in the transverse slot 80 in the end of the sleeve 73 on which the annular stop shoulder 74 is formed. The mode of shifting the driving member of the clutch 76 into and out of connection with the sleeve 73 is by means of a shifting arm 81, one end of which is secured by means of the pivot 82 to the band 79, and mounting it between its ends by a pivot bolt 83 upon the bracket 84, carried by the frame A. The power end of the lever 81 is pivotally connected by the bolt 85 to the link 86, which in turn is pivotally fastened by the bolt 87 to that portion of the shifting arm 56 extending on its power end from the clutch member 52. In this manner a combined shifting lever is provided wherein the two clutches 52 and 76 are simultaneously thrown into and out of connection with their respective driven members, so that when moved to extreme position in one direction the drive wheels are adapted to be driven forward and when reversed to extreme position in the other direction the drive wheels are driven backward. The engagement between the clutch 52 and the gear 63 is adapted to transmit motion from the shaft 40 to said gear, said gear being freely journaled upon the shaft 40 between two collars 88 and 89, mounted upon said shaft.

The construction described pertaining to one side of the mechanism for connecting to one of the drive wheels is similar to the construction of mechanism on the other side connecting with the other drive wheel and by the construction set forth the drive wheels may be operated together or either one separately and the machine can easily be controlled by an operator through the use of the levers 31, 54 and 56. To start or reverse the vehicle, it is only necessary to throw either or both of said drive wheels into or out of connection for forward or backward movement thereof. It is also feasible to stop the machine by throwing the shifting levers 54 and 56 into neutral position or by throwing the lever 31 into position disconnecting the drive gear 29 with the operating shaft or shafts of the engine.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In a self propelled vehicle, a supporting frame, carrying wheels for said frame, one of which forming a propelling element and being freely journaled, a prime mover carried by said frame, a drive shaft journaled on said frame parallel to the axis of said propelling element, said propelling element carrying gear teeth adjacent its rim, a pinion on said shaft having straight teeth meshing with the teeth on said driving element, a counter shaft journaled on said frame, whose axis lies parallel with the axis of said shaft, a pinion on said counter shaft having straight teeth meshing with the teeth on said driving element, a train of gearing carried by said frame and connecting said prime mover with said shaft and counter shaft, the axes of rotation of the gears constituting said train lying parallel with the axes of said prime mover, shaft and counter shaft, clutches carried by said shaft and counter shaft, and adapted to communicate motion from said train of gearing to said shaft and counter shaft and means for shifting said clutches simultaneously into and out of connection with said gears whereby motion is transmitted to said driving element in a direct manner to revolve it either in forward or backward direction.

2. In a self propelled vehicle, a supporting frame, carrying wheels for said frame, a pair of which are adapted to propel said vehicle and are freely journaled upon said frame, a prime mover carried by said frame, differential gearing operatively connected with said prime mover, a pair of main shafts journaled on said frame parallel to the axis of said propelling wheels and connected with said differential gearing to be driven thereby, pinions carried by the outer ends of said shafts, counter shafts journaled upon said frame in co-axial alinement and lying parallel to the axis of said main shafts, gear teeth carried by the inner surfaces of the rims of said propelling wheels with which the teeth of said pinions are adapted to mesh, means carried by each of said main shafts for driving one of said counter shafts and clutches interposed between each of said main shafts and its driven counter shaft and adapted to communicate motion to drive either said main shafts or its counter shaft, whereby the propelling wheels are adapted to be revolved in either a forward or backward direction.

In testimony whereof, I have signed my name to this specification, in the presence of two subscribing witnesses.

DANIEL MEYER.

Witnesses:
H. L. FISCHER,
F. G. BRADBURY.

Copies of this patent may be obtained for five cents each, by addressing the "Commissioner of Patents, Washington, D. C."